United States Patent
Michael et al.

(10) Patent No.: US 6,280,921 B1
(45) Date of Patent: Aug. 28, 2001

(54) COLOR PHOTOGRAPHIC SILVER HALIDE MATERIAL

(75) Inventors: Missfeldt Michael, Leichlingen; Herrmann Stefan, Bonn, both of (DE)

(73) Assignee: AGFA-Gevaert (BE)

( * ) Notice: Subject to any disclaimer, the term of this patent is extended or adjusted under 35 U.S.C. 154(b) by 0 days.

(21) Appl. No.: 09/501,713

(22) Filed: Feb. 11, 2000

(30) Foreign Application Priority Data

Feb. 18, 1999 (DE) .............................. 199 06 653

(51) Int. Cl.$^7$ ........................................ G03C 1/14
(52) U.S. Cl. ................... 430/583; 430/581; 430/584; 430/585; 430/588
(58) Field of Search ................... 430/583, 584, 430/585, 581, 588

(56) References Cited

U.S. PATENT DOCUMENTS

| | | | |
|---|---|---|---|
| 5,422,238 | * 6/1995 | Ikegawa et al. | 430/583 |
| 5,919,613 | * 7/1999 | Missfeldt | 430/583 |
| 5,942,382 | * 8/1999 | Sinzger et al. | 430/583 |
| 6,010,838 | * 1/2000 | Weimann et al. | 430/577 |

FOREIGN PATENT DOCUMENTS

19724585 A1  * 12/1998  (DE) .

* cited by examiner

Primary Examiner—Thorl Chea
(74) Attorney, Agent, or Firm—Connolly Bove Lodge & Hutz LLP

(57) ABSTRACT

A color photographic silver halide material which contains at least one light-sensitive silver halide emulsion, and a cyanine dye of formula (I)

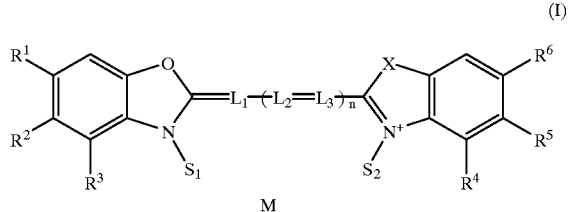

wherein $R^1$, $R^2$, $R^3$, $R^4$, $R^5$ and $R^6$, independently of each other, each represent a substituent, with the proviso that at least one of the radicals $R^1$, $R^2$ and $R^3$ represents a benzthienyl substituent, X represents O, S, Se, $NR_7$, CH=CH or $C(CH_3)_2$, wherein $R_7$ represents an alkyl radical which is optionally substituted, $S_1$ and $S_2$ independently of each other, represent alkyl, sulphoalkyl, carboxyalkyl, $-(CH_2)_1-SO_2-Y-SO_2$-alkyl, $-(CH_2)_1-SO_2-Y-CO$-alkyl, $-(CH_2)_1-CO-Y-SO_2$-alkyl, $-(CH_2)_1-CO-Y-O$-alkyl, $-(CH_2)_1-NH-SO_3^\ominus$, $-(CH_2)_1-N(alkyl)-SO_3^\ominus$ or $-(CH_2)_1-N(Aryl)-SO_3^\ominus$, with the proviso that $l=1$ to 6 and Y is NH or N—, n is 0, 1, 2 or 3, $L_1$, $L_2$ and $L_3$ independently represent a substituted or unsubstituted methine group, which may be a constituent of one or more carbocyclic rings, and M represents a counterion which may be necessary for charge compensation.

16 Claims, No Drawings

COLOR PHOTOGRAPHIC SILVER HALIDE MATERIAL

DESCRIPTION

The present invention relates to cyanine dyes corresponding to formula (I), to a colour photographic material which contains cyanine dyes of formula (I), and to the use of compounds of formula (I) as spectral sensitisers.

Improving the spectral sensitivity of photographic materials constitutes a permanent challenge. It is known that polymethine dyes can be used in order to increase the sensitivity beyond the range of intrinsic sensitivity of the silver halide which is used. Cyanine dyes are particularly suitable for this purpose.

Cyanines based on thienyl-substitituted benzoxazoles are known from the prior art, such as DE 1063028, JP 09/106028, JP 09/138476, JP 09/311398 and JP 10123650 for example.

EP 0 599 383 discloses cyanine dyes which, as a constituent of silver halide emulsion layers, are used in particular to prevent the formation of colour stains after processing when tab grain emulsionsd are used. These are cyanine dyes, the benzo nucleus of which is linked to a furanyl or pyrrolyl substituent.

However, there is a need for cyanine dyes which, particularly when they are used in tab grain emulsions, exhibit both increased spectral sensitivity and good stability on storage, especially after storage under conditions of high temperature and high humidity.

The underlying object of the present invention is to provide cyanine dyes which are distinguished by their particularly high spectral sensitivity and at the same time by their good long-term stability on storage, even under tropical conditions. As far as possible, the materials should retain their sensitivity even after long-term storage under tropical conditions.

It has surprisingly been found that cyanine dyes which contain benzoxazole, which correspond to formula (I), and which comprise at least one benzthienyl substituent, exhibit outstanding spectral sensitivity, whilst at the same time exhibiting good stability on storage even under tropical conditions. In addition, it has proved possible significantly to increase the spectral sensitivity of tab grain emulsions.

The present Application relates to cyanine dyes of formula (I)

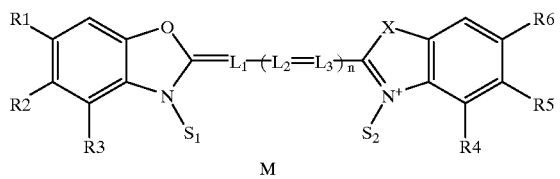

(I)

wherein
R1, R2, R3 R4, R5 and R6, independently of each other, each represent a substituent, with the proviso that at least one of the radicals R1, R2, R3 represents a benzthienyl substituent, x represents O, S, Se, NR7, CH=CH or C(CH3)2, wherein R7 represents an alkyl radical which is optionally substituted, S1, S2 independently of each other, represent alkyl, sulphoalkyl, carboxyalkyl, —(CH2)1—SO2—Y—SO2-alkyl, —(CH2)1—SO2—Y—CO-alkyl, —(CH2)1—CO—Y—SO2-alkyl, —(CH2)1—CO—Y—O—alkyl, —(CH$_2$)$_1$—NH—SO$_3^\ominus$, —(CH$_2$)$_1$—N(alkyl-SO$_3^\ominus$ or —(CH$_2$)$_1$—N(Aryl)—SO$_3^\ominus$, with the proviso that 1=1 to 6 and Y denotes NH or N—, n denotes 0, 1, 2, 3, L1, L2, L3 represent a substituted or unsubstituted methine group, which may be a constituent of one or more carbocyclic rings, and M represents a counterion which may be necessary for charge compensation.

Unless a more special definition is given, a substituent in the sense of the present invention is to be understood, for example, as H, a halogen, preferably F, Cl or Br, an aryl, an alkyl—aryl, a hetaryl, an alkyl, an alkenyl, or OR10, wherein R10 represents a C1 to C6 alkyl, particularly methyl, ethyl and propyl. Furthermore, the term "substituent" can also denote condensed-on ring systems, which may optionally be substituted. Thus R6 may form a condensed-on ring system with R5, or R5 may form a condensed-on ring system with R4, for example. The term "condensed-on ring systems" is to be understood preferably to comprise benzo or naphtho ring systems.

Unless defined otherwise, "alkyl" in the sense of the present Application should be understood to comprise linear or branched, cyclic or straight-chain, substituted or unsubstituted hydrocarbon groups. The preferred alkyl groups are alkyl groups comprising 1 to 20 C atoms, particularly 1 to 6 C atoms. Open-chain alkyl groups which are particularly suitable include methyl, ethyl, n-propyl, n-butyl and n-pentyl radicals, and branched alkyl radicals which are particularly suitable include those with branched methyl or ethyl groups. Other suitable substituents include partially or completely halogenated alkyl groups, such as CF3 or —CH2CF2CF2H in particular. Substituents such as OH are also preferred.

Unless defined otherwise, "alkenyl" in the sense of the present invention should be understood to denote linear or branched, cyclic or straight-chain, substituted or unsubstituted, unsaturated hydrocarbon radicals, such as ethenyl, 2-propenyl and isopropenyl for example.

Unless defined otherwise, "aryl" in the sense of the present Application should be understood to denote aromatic hydrocarbon groups, which are preferably 5- or 6-membered ring systems but which can also exist in monocyclic form or as condensed ring systems also. These ring systems can be either substituted or unsubstituted ring systems. Phnely and naphthyl groups are particularly preferred, for example. Suitable substituents include the groups cited above, preferably halogen, alkyl, and OR10 with the meaning given above.

Unless defined otherwise, "hetaryl" in the sense of the present Application should be understood to denote aromatic systems which contain at least one hetero atom. These systems may comprise both substituted and unsubstituted ring systems. Typical examples include pyridine, pyridazine, pyrimidine, pyrazines, oxazole, isoxazole, thiazoles, 3,4-oxdiazole, 1,2,4-oxdiazole, imidazole, 1,2,3-triazole and 1,2,4-triazole. Heterocyclic substituents which are particularly preferred include 2-furanyl, 3-furanyl, N-pyrrolyl, 2-pyrrolyl, 3-pyrrolyl, 2-thienyl, 3-thienyl and N-indolyl.

Unless defined otherwise, and depending on the substituent and thus on the charge relationship, the following entitites are suitable as counterions M in the sense of the present invention: tosylate, I-, Br-, Cl-, or preferably diazabicyclooctane (DABCOH+) or diazabicycloundecane (DBUH+), or pyridine or H+, and particularly Na+, Li+, K+and most preferably Et3N+H.

n represents 0,1,2,3, preferably 0,1 or 2.

Compounds of formula (I) which are particularly preferred are the compounds of formula (Ia) listed below:

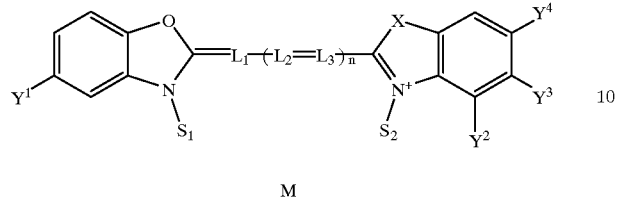

(Ia)

M wherein

Y1 represents a benzthienyl group which is bonded to the nucleus via the 2-, 3-, 4-, 5-, 6- or 7-positions, Y2, Y3 and Y4 independently of each other represent H, halogen, in particular F, Cl or Br, a substituted or unsubstituted 1-, 2-, 3-pyrrolyl, 2- or 3-thienyl, 2-, 3-, 4-, 5-, 6-, or 7-benzthienyl, N-indolyl, phenyl or 2- or 3-furanyl residue, alkyl, preferably having 1 to 6 C atoms, in particular methyl, ethyl or propyl, or Y2 and Y3 or Y3 and Y4 may be a constituent of a fused benzo or naphtho ring, X represents O, S, Se, NR7, CH=CH or C(CH3)2, wherein R7 represents an alkyl radical which is optionally substituted, S1, S2 independently of each other, represent alky, sulphoalkyl, carboxyalkyl, —(CH2)l—SO2—Y—SO2-alkyl, —(CH2)l—SO2—Y—CO-alkyl, —(CH2)l—CO—Y—SO2-alkyl, —(CH2)l—CO—Y—O-alkyl or —(CH2)l—NH—SO3È, —(CH2)l—N(alkyl)—SO3È or —(CH2)l—N(Aryl)—SO3È, with the proviso that l=1 to 6 and Y denotes NH or N—, n denotes 0, 1, 2, 3, L1, L2, L3 represent a substituted or unsubstituted methine group, which may be a constituent of one or more carbocyclic rings, and M represents a counterion which may be necessary for charge compensation.

A list of typical compounds which are particularly preferred according to the present invention is given below:

I-1

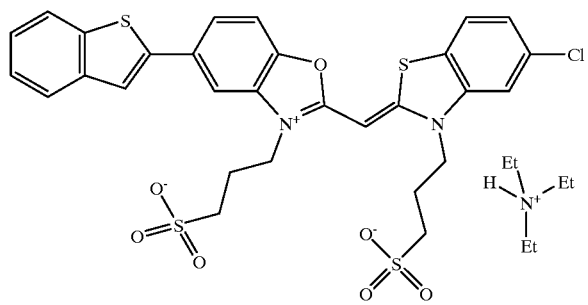

I-2

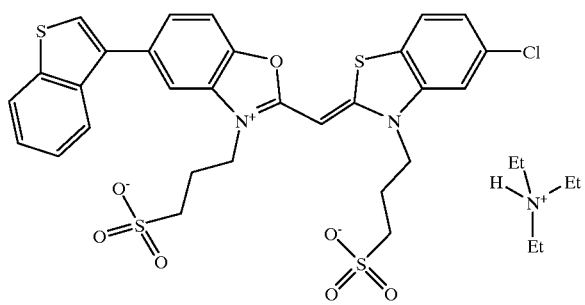

I-3

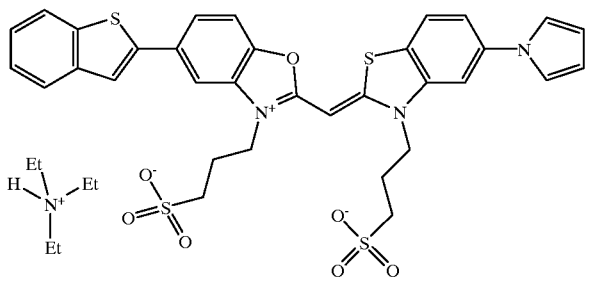

I-4

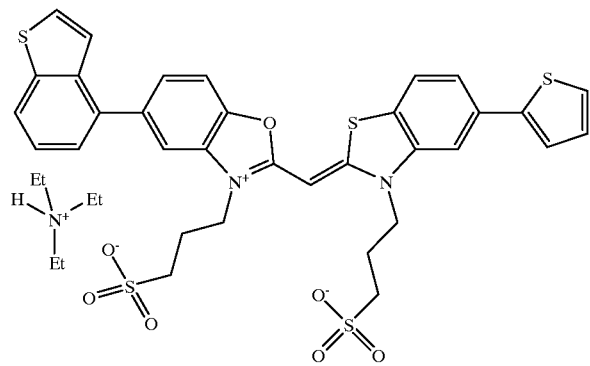

-continued
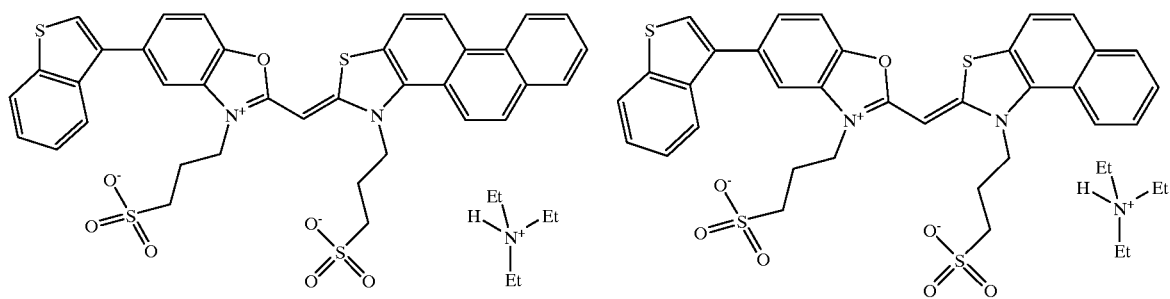
I-5  I-6
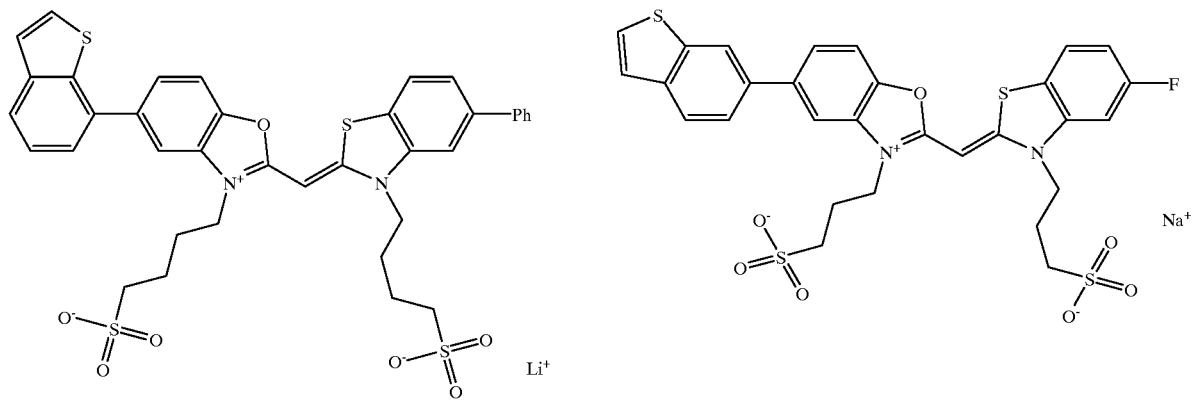
I-7  I-8
I-9  I-10
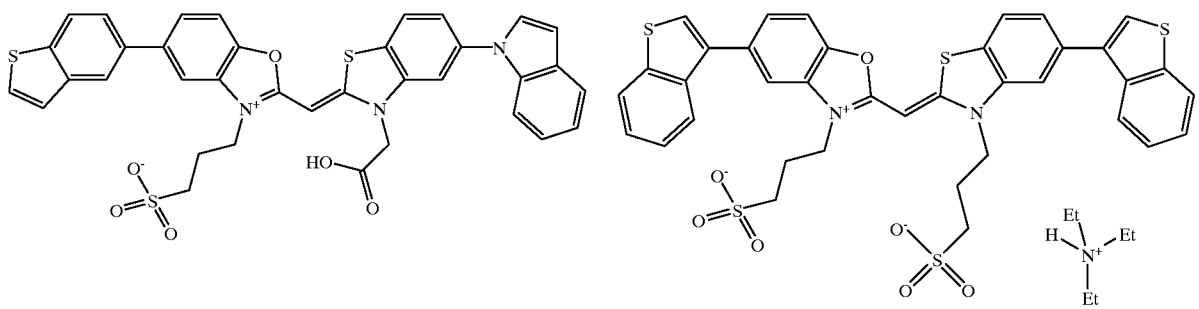
I-11
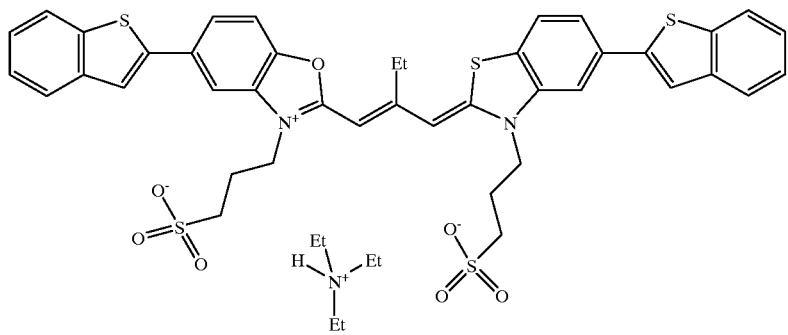
I-12  I-13

-continued
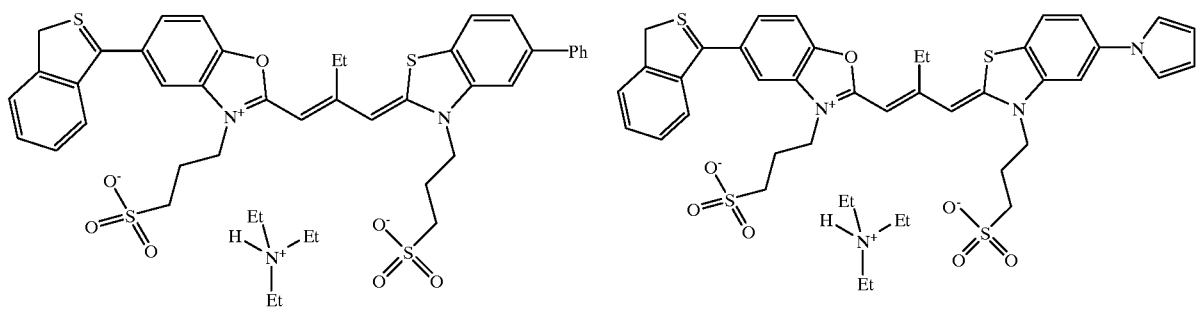
I-14              I-15
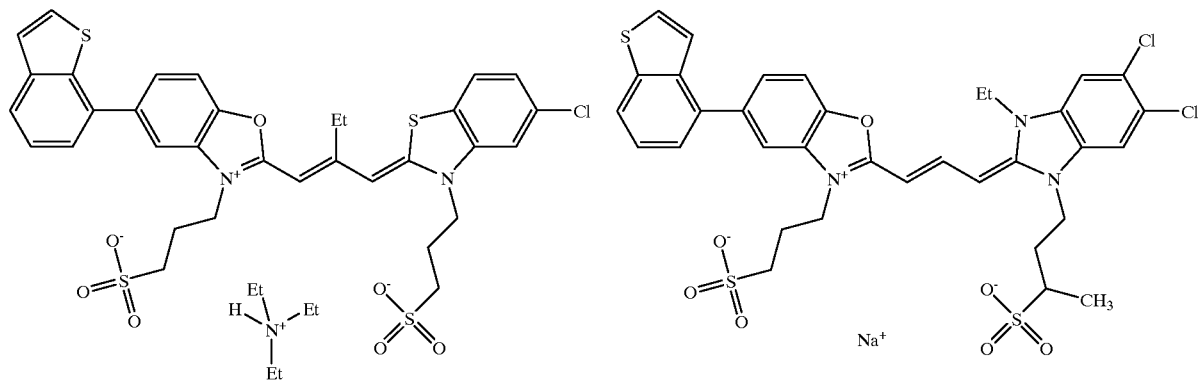
I-16              I-17
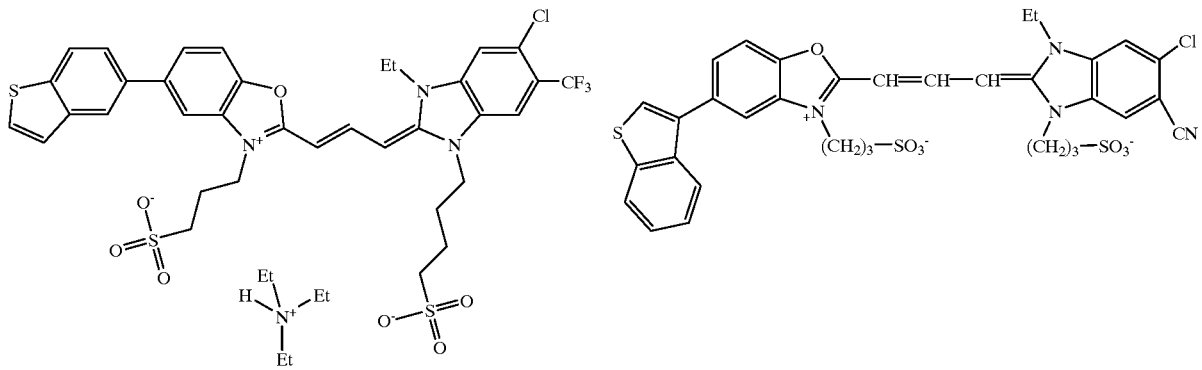
I-18              I-19
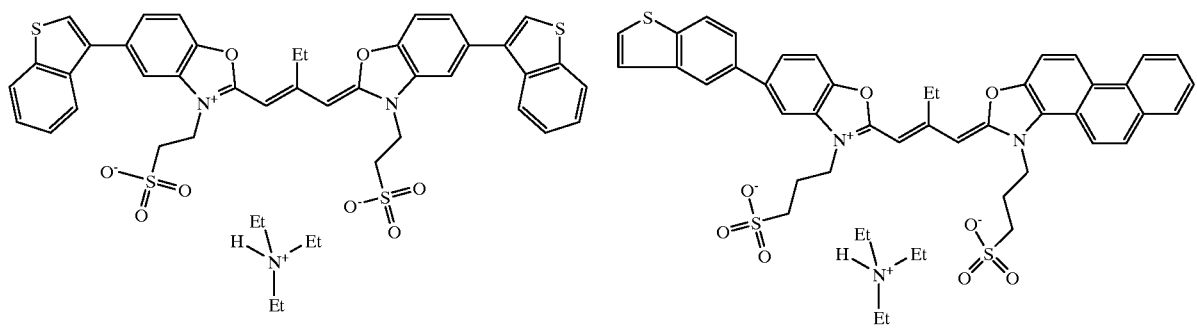

-continued
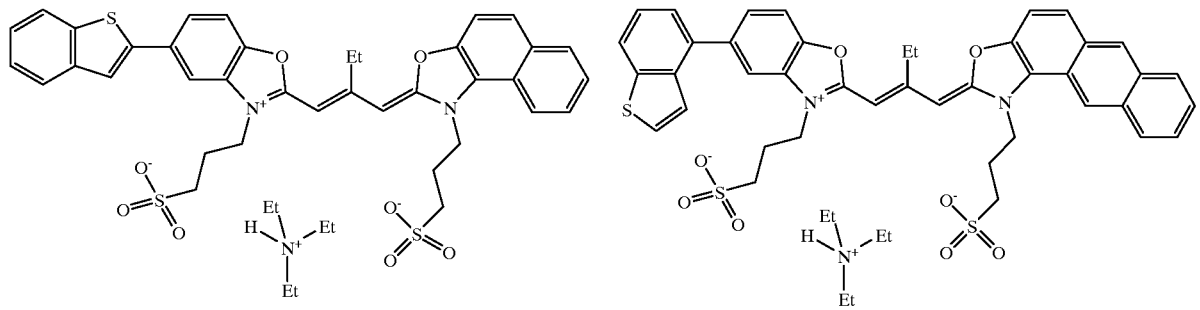
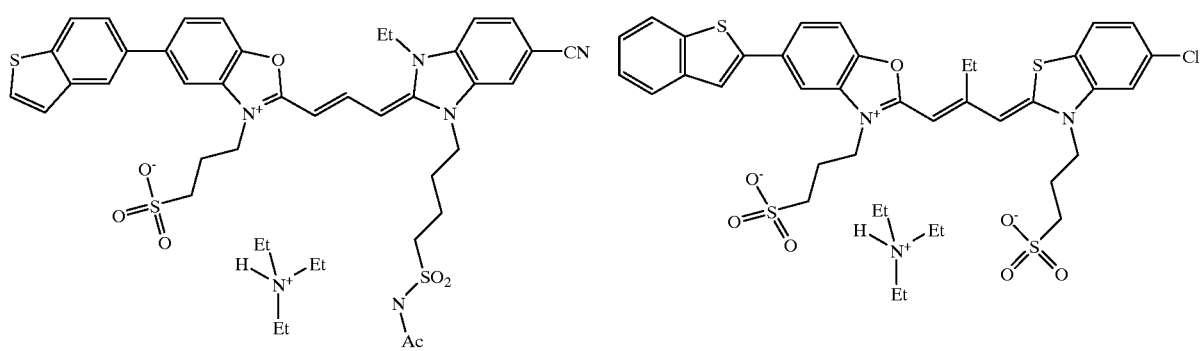
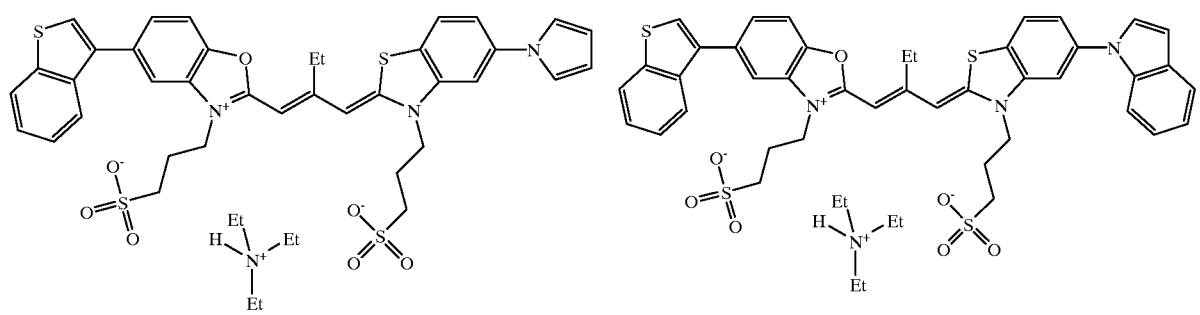
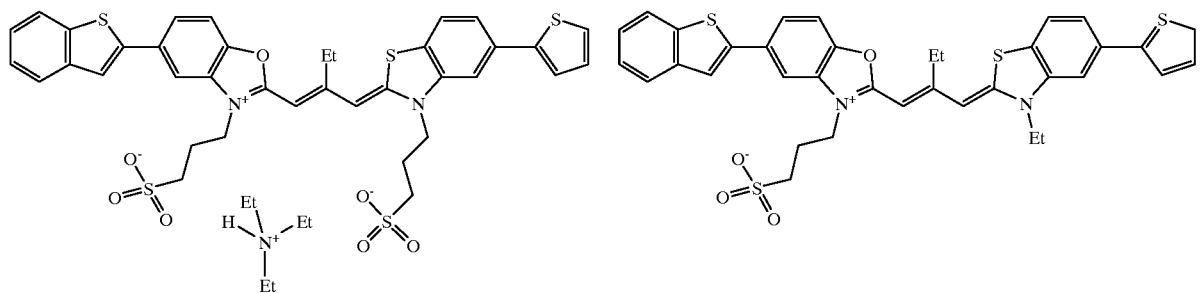

-continued
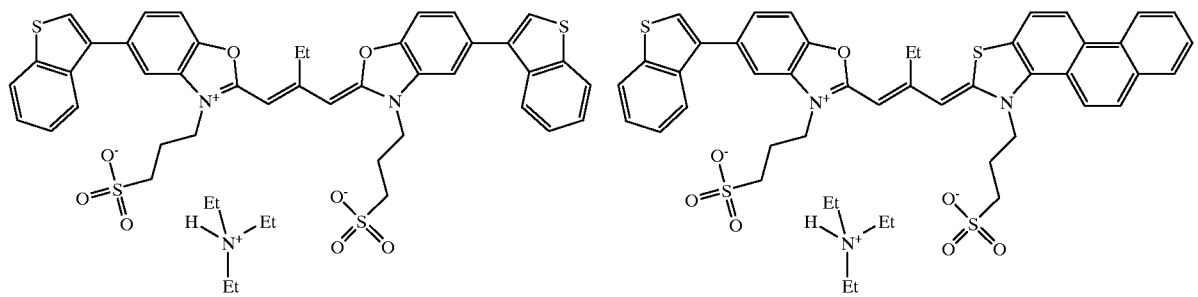
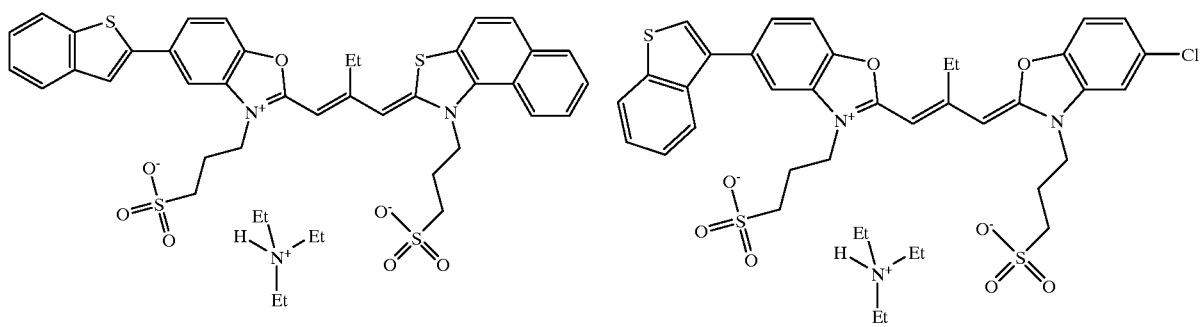
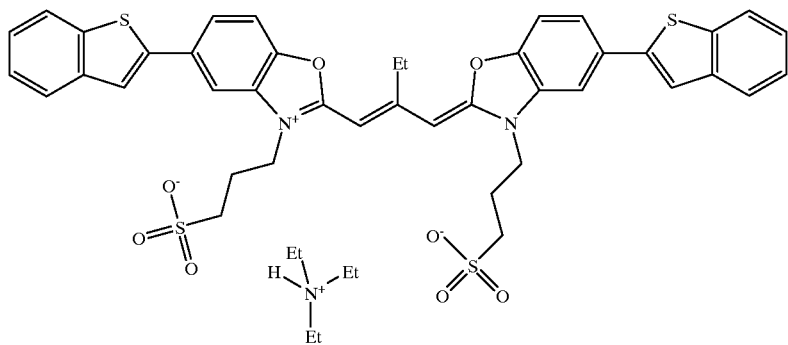
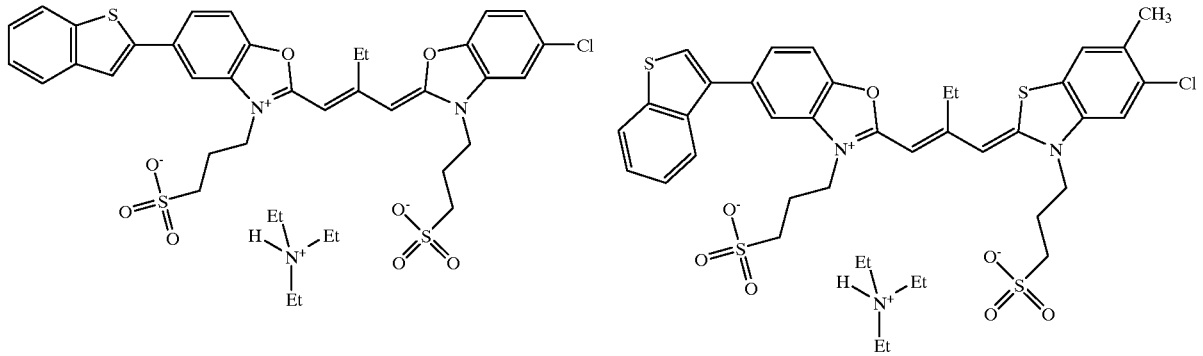

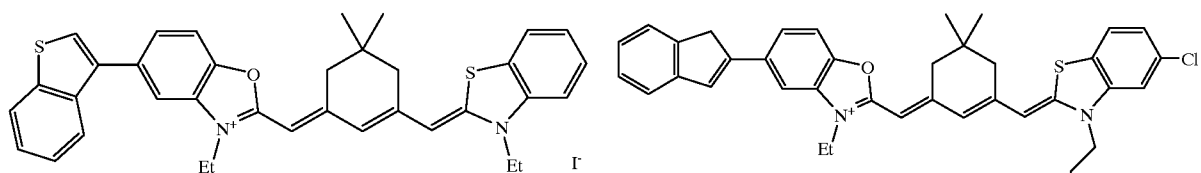
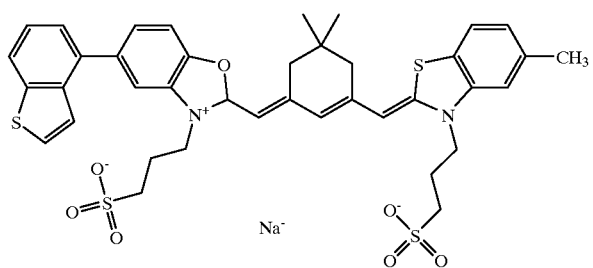
The preparation of dyes I-2 and I-28 will be explained with reference to the following reaction schemes:
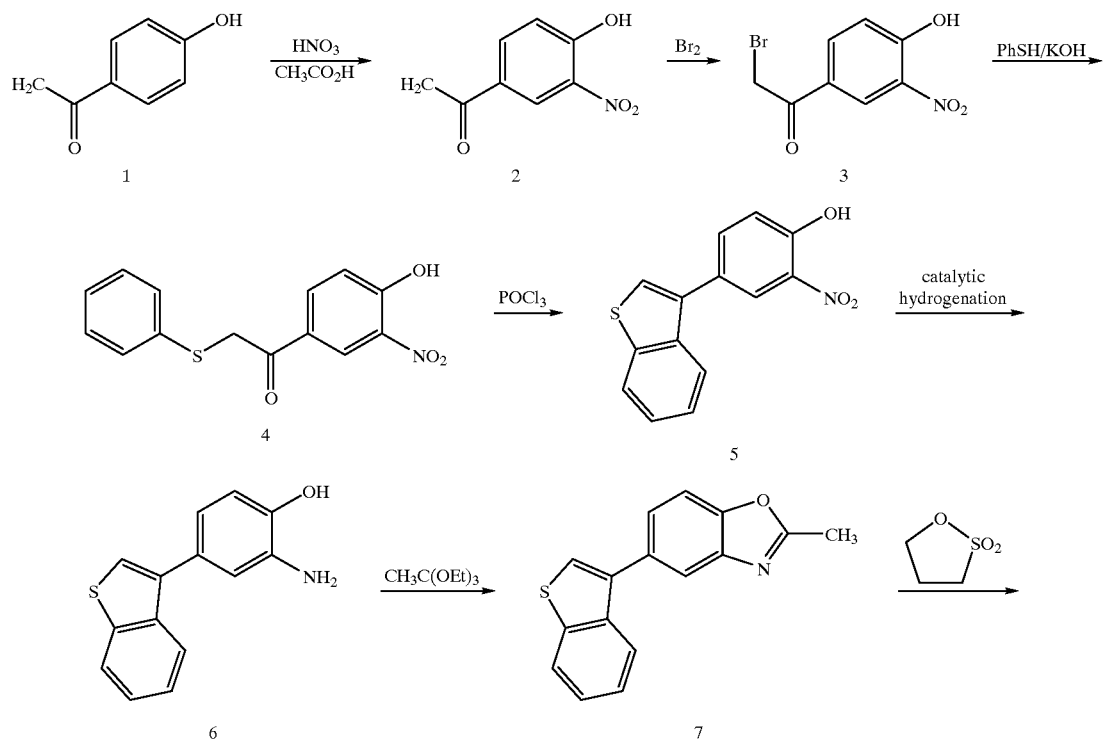

-continued

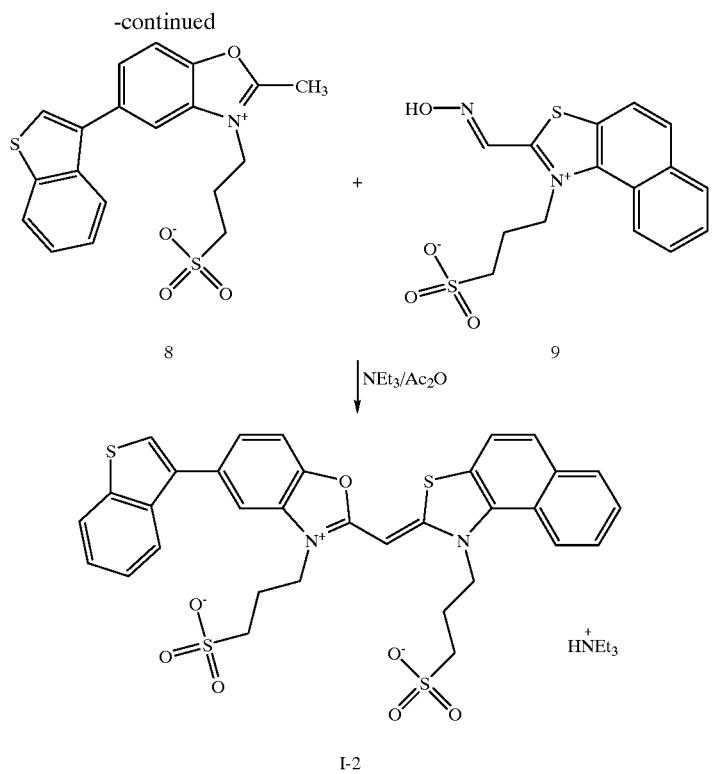

I-2

Scheme 1: synthesis of dye I-2. Starting from p-acetylphenol 1 (manufactured by Fluka) the preparation of 2 was effected analogously to the method described in J.Chem.Eng.Data 26, 23 d (1981), 3 was synthesised according to J. Heterocyclic Chem. 25, 1417 (1988), and compounds 4, 5 and 6 were prepared analogously to the instructions on pages 70/71, 363 and 523 of the text by L.F.Tietze and Th. Eicher, Georg Thieme Verlag Stuttgart, New York, 2nd Edition. Compounds 7 and 8 were prepared analogously to Z-3 and Z-4 from US 5512423, page 16.

Compound 9 was prepared by the method described in Res. Discl. 182, 301–303 (1979).

Dye Condensation Reaction to Form I-2:

3.88 g (0.01 mol) 8 and 3.5 g (0.01 mol) 9 were digested, with stirring, in 20 ml formamide at room temperature, and the batch was cooled to 10–15° C., was treated with 3 ml acetic anhydride, and was treated over 5 minutes with 8.7 ml triethylamine. After 16 hours at room temperature, 100 ml acetone were added, and the precipitated dye was filtered off under suction and was recrystallised hot from methanol.

Yield: (30.2 % theoretical)

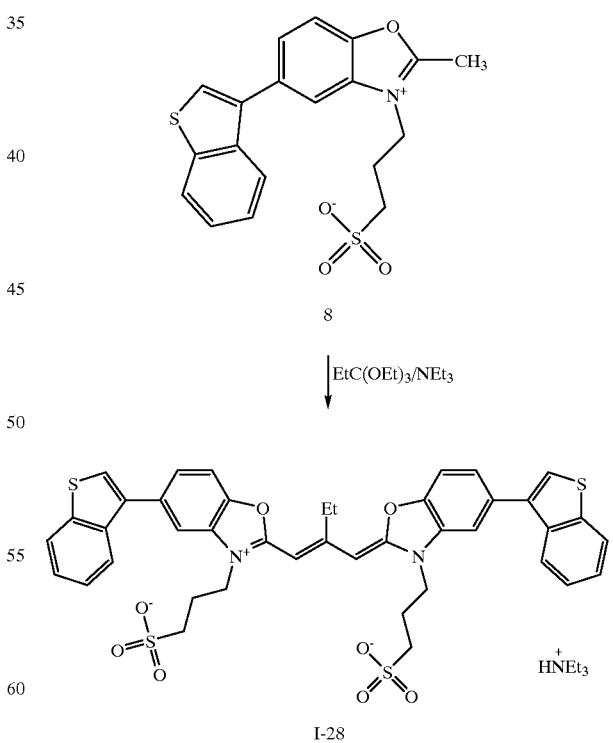

I-28

Scheme 2: Synthesis of Dye I-28.
Dye Condensation Reaction to Form I-28:

3.88 g (0.01 mol) 8 were heated to 80–83° C. together with 2.8 g (0.016 mol) triethyl ortho-propionate, with stirring, in 15 ml m-cresol for 1.5 hours. After cooling to room temperature, 3.88 g 8, dissolved in 10 ml m-cresol, and 4.2 ml triethylamine were added to the reaction solution and the batch was held at 95–97° C. for 1.5 hours with stirring. After cooling to room temperature, 150 ml ethyl acetate were added, and after stirring for several hours the precipitated dye was filtered off under suction, washed with ethyl acetate and recrystallised hot from methanol.

Yield: 1.9 g (20.8 % theoretical)

The cyanines according to the invention were prepared by employing the methods of synthesis which are described in "THE CYANINE DYES AND RELATED COMPOUNDS" by Frances M. Hamer, Interscience Publishers (1964).

The use of the sensitising dyes according to the invention not only results in high sensitivity, but also results in stable sensitisation in the blue spectral region between 390 and 510 nm, in the green spectral region between 510 and 590 nm, in the red spectral region between 590 and 680 nm and between 680 to 750 nm, and in the infrared spectral region. Stable sensitisation should be understood to mean that after storage, even under tropical conditions which in the sense of the present Application should be understood to mean storage at 35° C. and 90% relative atmospheric humidity for 7 days, the spectral sensitivity of the sensitising dyes according to the invention remained substantially unchanged.

In one particularly preferred embodiment, at least one cyanine dye according to the invention is used with at least one dye corresponding to compound (II)

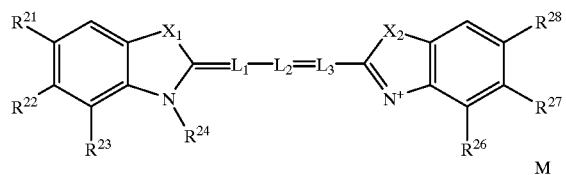

(II)

wherein
- X1, X2 independently of each other, represent O, S, Se, NR9, C(CH3)2 or CH=CH, wherein R9 represents an alkyl radical which is optionally substituted,
- R24, R25 independently of each other, represent alkyl, sulphoalkyl, carboxyalkyl, (CH2)1—SO2—Y—SO2-alkyl, —(CH2)1—SO2—Y—CO-alkyl, —(CH2)1—CO—Y—SO2-alkyl or —(CH2)1—CO—Y—CO-alkyl, with the proviso that 1=1 to 6 and Y denotes NH or N-,
- R21, R22, R23, R26, R27 and R28 independently of each other, represent a halogen, H, alkyl, alkoxy, 2-thienyl, 3-thienyl, 1-pyrrolyl, 2-furanyl, 3-furanyl, CN, CF3 or aryl; or R21 together with R22, or R22 together with R23, or R26 together with R27, or R27 together with R28 denote the remaining members for the completion of a condensed-on benzo or naphtho ring system which is optionally substituted,
- n1=0, 1,
- L1, L2, L3 independently of each other, represent substituted or unsubstituted methine groups, and
- M represents a counterion which may be necessary for charge compensation.

Suitable compounds of formula (II) include:

(II)-8
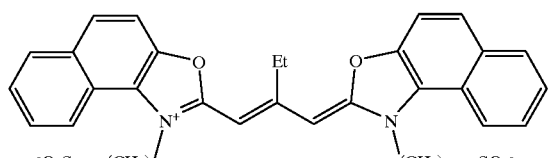

(II)-9
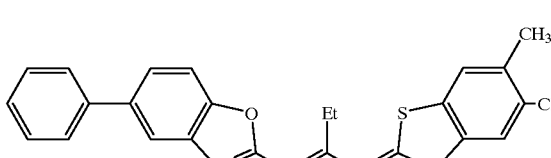

(II)-10
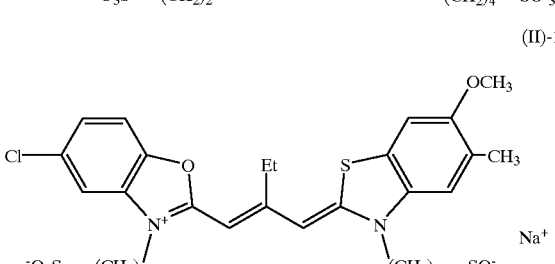

(II)-11
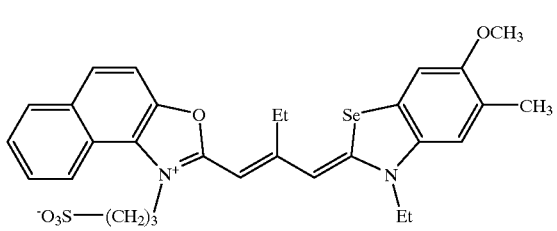

(II)-12
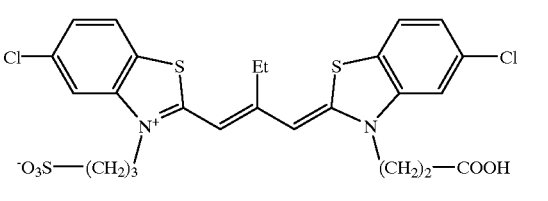

(II)-13
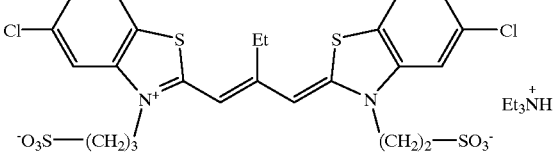

(II)-14
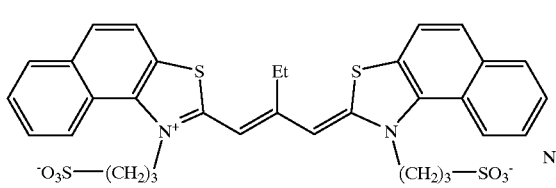

(II)-15
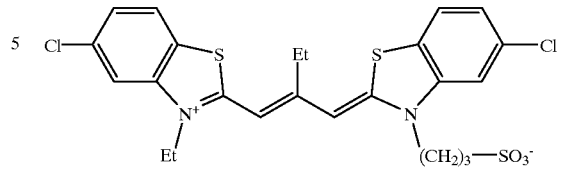

(II)-16
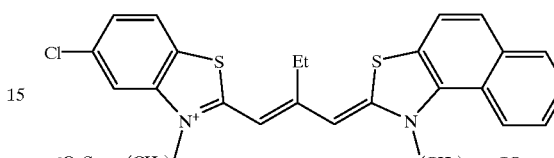

(II)-17
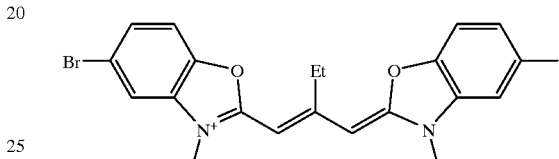

(II)-18
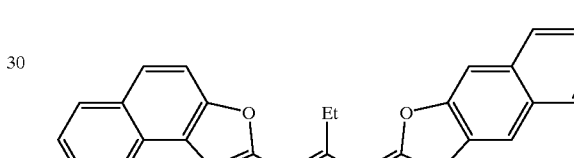

(II)-19
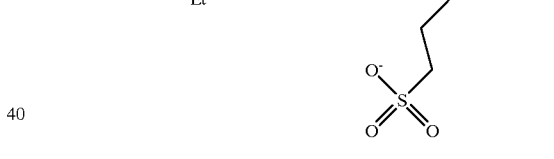

(II)-20
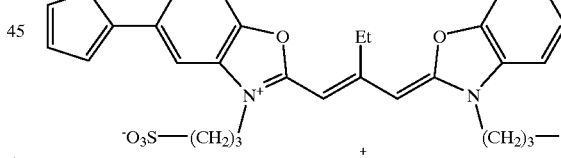

By the combined use of compounds of formulae (I) and (II), an even higher spectral sensitivity can be achieved, and particularly good stability on storage can be achieved at the same time, especially with regard to stability under tropical conditions. According to the invention, compounds (I) and (II) are preferably present in a mixture ratio from 0.1:10 to 10:0.1. A mixture ratio of compounds of formula (I) to those of formula (II) from 3:1 to 20:1 is particularly preferred.

According to the present invention, at least one compound of formula (I) is used, and three compounds of formula (I) are preferably used. As explained above, a mixture comprising compounds of formula (II) is particularly preferred. Two compounds corresponding to formula (I) with one compound of formula (II), or two compounds corresponding to formula (II) with one compound of formula (I) are preferably used in this mixture.

The present invention further relates to a colour photographic material containing cyanine dyes corresponding to formula (I), preferably those corresponding to formula (Ia), particularly together with compounds of formula (II). According to the invention, the cyanine dyes can be added to colour photographic materials in the usual amounts, for example from 1 to 3000, preferably from 100 to 2000 and particularly from 200 to 900 $\mu$mol/mol AgNO3. The colour photographic materials which are thus obtained are distinguished by their particularly high spectral sensitivity, which is substantially retained even after storage under extreme conditions (tropical conditions).

The present invention also relates to the use of compounds of formula (I) as spectral sensitisers.

Examples of colour photographic materials include colour negative films, colour reversal films, colour positive films, colour photographic paper, colour reversal photographic paper, and colour-sensitive materials for the colour diffusion transfer process or the silver halide bleaching process. A review is given in Research Disclosure 37038 (1995) and in Research Disclosure 38957 (1996).

Photographic materials consist of a support on which at least one light-sensitive silver halide emulsion layer is deposited. Thin films and foils are particularly suitable as supports. A review of support materials and of the auxiliary layers which are deposited on the front and back thereof is given in Research Disclosure 37254, Part 1 (1995), page 285 and in Research Disclosure 38957, Part XV (1996), page 627.

Colour photographic materials usually contain at least one red-sensitive, at least one green-sensitive and at least one blue-sensitive silver halide emulsion layer, and optionally contain intermediate layers and protective layers also.

Depending on the type of photographic material, these layers may be arranged differently. This will be illustrated for the most important products:

Colour photographic films such as colour negative films and colour reversal films comprise, in the following sequence on their support: 2 or 3 red-sensitive, cyan-coupling silver halide emulsion layers, 2 or 3 green-sensitive, magenta coupling silver halide emulsion layers, and 2 or 3 blue-sensitive, yellow-coupling silver halide emulsion layers. The layers of identical spectral sensitivity differ as regards their photographic speed, wherein the less sensitive partial layers are generally disposed nearer the support than are the more highly sensitive partial layers.

A yellow filter layer is usually provided between the green-sensitive and blue-sensitive layers, to prevent blue light from reaching the layers underneath.

The options for different layer arrangements and their effects on photographic properties are described in J. Inf. Rec. Mats., 1994, Vol. 22, pages 183–193, and in Research Disclosure 38957, Part XI (1996), page 624.

Colour photographic paper, which as a rule is less sensitive to light than is colour photographic film, usually comprises the following layers on the support, in the following sequence: a blue-sensitive, yellow-coupling silver halide emulsion layer, a green-sensitive, magenta coupling silver halide emulsion layer, and a red-sensitive, cyan-coupling silver halide emulsion layer.

Departures from the number and arrangement of the light-sensitive layers may be effected in order to achieve defined results. For example, all the high-sensitivity layers may be combined to form a layer stack and all the low-sensitivity layers may be combined to form another layer stack in a photographic film, in order to increase the sensitivity (DE 25 30 645).

The essential constituents of the photographic emulsion layer are the binder, the silver halide grains and colour couplers.

Information on suitable binders is given in Research Disclosure 37254, Part 2 (1995), page 286, and in Research Disclosure 38957, Part Ia (1996), page 598.

Information on suitable silver halide emulsions, their production, ripening, stabilisation and spectral sensitisation, including suitable spectral sensitisers, is given in Research Disclosure 37254, Part 3 (1995), page 286, in Research Disclosure 37038, Part XV (1995), page 89, and in Research Disclosure 38957, Part VA (1996), page 603.

In the sense of the present invention, the emulsions which are used in one preferred embodiment are tab grain emulsions. This term should be understood to mean emulsions comprising silver halide crystals which exhibit a tabular habit with an aspect ratio >2, wherein the aspect ratio is the ratio of the diameter of the circle of equivalent area on a projection surface to the thickness of the crystal.

Photographic materials which exhibit camera-sensitivity usually contain silver bromide-iodide emulsions, which may also optionally contain small proportions of silver chloride. Photographic copier materials contain either silver chloride-bromide emulsions comprising up to 80 mole % AgBr, or silver chloride-bromide emulsions comprising more than 90 mole % AgCl. These emulsions may even comprise, for example, more than 95 mol %, more than 98 mol %, or even more than 99 mol % AgCl up to 100 mol % AgCl.

Information on colour couplers is to be found in Research Disclosure 37254, Part 4 (1995), page 288, in Research Disclosure 37038, Part 11 (1995), page 80, and in Research Disclosure 38957, Part XB (1996), page 616. The maximum absorption of the dyes formed from the couplers and from the colour developer oxidation product preferably falls within the following ranges: yellow couplers 430 to 460 nm, magenta couplers 540 to 560 nm, cyan couplers 630 to 700 nm.

In order to improve sensitivity, granularity, sharpness and colour separation, compounds are frequently used in colour photographic films which on reaction with the developer oxidation product release compounds which are photographically active, e.g. DIR couplers, which release a development inhibitor.

Information on compounds such as these, particularly couplers, is to be found in Research Disclosure 37254, Part 5 (1995), page 290, in Research Disclosure 37038, Part XIV (1995), page 86, and in Research Disclosure 38957, Part XC (1996), page 618. The colour couplers, which are mostly hydrophobic, and other hydrophobic constituents of the layers also, are usually dissolved or dispersed in high-boiling organic solvents. These solutions or dispersions are then emulsified in an aqueous binder solution (usually a gelatine solution), and after the layers have been dried are present as fine droplets (0.05 to 0.8 mm diameter) in the layers.

Suitable high-boiling organic solvents, methods of introduction into the layers of a photographic material, and other methods of introducing chemical compounds into photographic layers, are described in Research Disclosure 37254, Part 6 (1995), page 292.

The light-insensitive intermediate layers which are generally disposed between layers of different spectral sensitivity may contain media which prevent the unwanted diffusion of developer oxidation products from one light-sensitive layer into another light-sensitive layer which has a different spectral sensitivity.

Suitable compounds (white couplers, scavengers or DOP scavengers) are described in Research Disclosure 37254, Part 7 (1995), page 292, in Research Disclosure 37038, Part III (1995), page 84, and in Research Disclosure 38957, Part X.D (1996), page 621.

The photographic material may additionally contain compounds which absorb UV light, brighteners, spacers, filter dyes, formalin scavengers, light stabilisers, anti-oxidants, DMin dyes, additives for improving the dye-, coupler- and white stability and to reduce colour fogging, plasticisers (latices), biocides and other substances. Suitable compounds are given in Research Disclosure 37254, Part 8 (1995), page 292, in Research Disclosure 37038, Parts IV, V, VI, VII, X, XI and XIII (1995), pages 84 et seq., and in Research Disclosure 38957, Parts VI, VIII, IX, X (1996), pages 607, 610 et seq.

The layers of colour photographic materials are usually hardened, i.e. the binder used, preferably gelatine, is crosslinked by suitable chemical methods.

Suitable hardener substances are described in Research Disclosure 37254, Part 9 (1995), page 294, in Research Disclosure 37038, Part XII (1995), page 86, and in Research Disclosure 38957, Part IIB (1996), page 599.

After image-by-image exposure, colour photographic materials are processed by different methods corresponding to their character. Details on the procedures used and the chemicals required therefor are published in Research Disclosure 37254, Part 10 (1995), page 294, in Research Disclosure 37038, Parts XVI to XXIII (1995), page 95 et seq., and in Research Disclosure 38957, Parts XVIII, XIX, XX (1996), together with examples of materials.

EXAMPLES

Example 1

Basic Emulsion

A solution of 144 g inert gelatine and 107 g potassium bromide in 18 kg water was introduced into a vessel with stirring. An aqueous silver nitrate solution (47 g silver nitrate in 550 g water) and an aqueous halide solution (33 g in 550 g water) were added at 30° C. as a double inflow over 30 seconds. This was followed by the addition of 395 g inert gelatine in 4 kg water. After heating to 74° C., an aqueous silver nitrate solution (114 g silver nitrate in 1.4 kg water) was added over 20 minutes.

A second double inflow was added thereafter, again at 74° C. In the course of this procedure, an aqueous silver nitrate solution (1339 g silver nitrate in 8.3 kg water) and an aqueous halide solution (1117 g potassium bromide in 9.8 kg water) were added over 50 minutes at an increasing rate of addition. The rate of addition was increased in 10 stages, from an initial rate of 70 ml/minute to 400 ml/minute. During the addition, a constant pBr value of 2.3 was maintained in the dispersion medium.

After the last addition, the emulsion was cooled to 25° C., was flocculated at pH 3.5 by adding polystyrenesulphonic acid, and was subsequently washed at 20° C. Thereafter, the flocculate was re-dispersed with water, was made up to 7.5 kg and was re-dispersed at pH 6.5 and at a temperature of 50° C.

The emulsion contained a proportion of more than 80% (with respect to the projected area of the crystals) of hexagonal platelets with an aspect ratio (average diameter of the circle of equivalent area on the projection surface) of 8 and an adjacent edge ratio ranging from 1:1 to 1.5:1. The grain size was 0.55 sum and the breadth of distribution was 18%.

The silver halide emulsion was chemically ripened at 55° C., pAg 7.4 and pH 6.5 with 5.0 μmol tetrachloroauric acid, 690 μmol potassium thiocyanate and 20 μmol sodium thiosulphate per mol AgNO3.

The emulsion was spectrally sensitised as follows: 350 μmol 4-hydroxy-6-methyl-1,3,3a,7-tetraazaindene per 100 g AgNO3 were added to the emulsion at 40° C., followed by the addition of 500 μmol per mol AgNO3 of each spectral sensitiser, dissolved in methanol or in a methanol/phenoxyethanol mixture, and thereafter the batch was stirred for a further 20 minutes at 40° C.

When mixtures of sensitisers were used, the total amount thereof was standardised at 500 μmol/mol AgNO3 in each case. The sensitiser listed first in Tables 2 and 3 was also added to the emulsion first, and the second sensitiser was added after stirring for 20 minutes at 40° C., or if necessary after a further 20 minutes at 40° C.

The emulsion was mixed with emulsified cyan coupler BG-1 and with emulsified cyan coupler BG-2 and was deposited on a film base of thickness 120 μm comprising cellulose acetate on a substrate.

The cast individual layers contained the following substances per m2:

| | |
|---|---|
| AgBr corresponding to | 0.63 g AgNO$_3$ |
| | 1.38 g gelatine |
| | 0.95 g magenta coupler M-1 |
| | 0.29 g tricresyl phosphate. |

The material was hardend by depositing a protective layer comprising 0.2 g gelatine and 0.3 of instant hardener (H- 1) per m2.

The sensitivity of the materials prepared in this manner was determined. For this purpose, samples of the materials were exposed behind a graduated wedge and were subjected to colour negative processing according to "The Journal of Photographic Science 1974, pages 597, 598". The results are listed in Tables 1 to 3.

TABLE 1

M-1

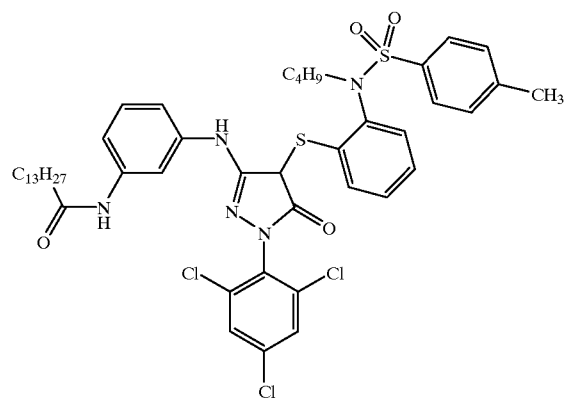

TABLE 1-continued

H-1

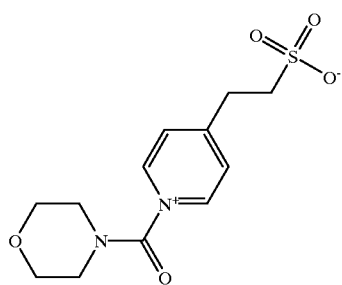

| Spectral sensitisers | Sensitivity* | Type of sample |
|---|---|---|
| I-32 | 1.00 | invention |
| I-34 | 0.98 | invention |
| V-1 | 0.94 | comparison |
| V-2 | 0.94 | comparison |
| II-3 | 0.92 | comparison |

*Sensitivity normalised to that of I-32.

V-1

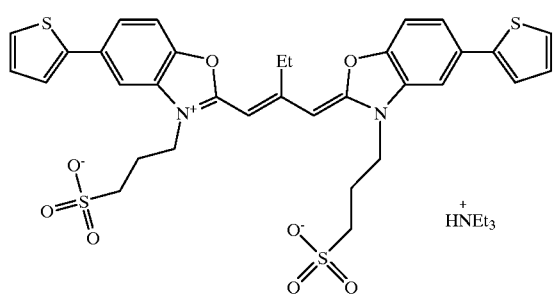

V-2

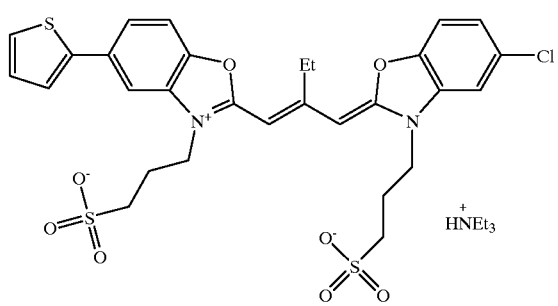

TABLE 2

*The Sensitivity normalised to that of combination I-33/II-18.
The dye listed first was also added first to the emulsion.

| Spectral sensitiser mixture | Mixture ratio | Sensitivity* | Type of sample |
|---|---|---|---|
| I-31/II-18 | 1/1 | 0.98 | invention |
| I-33/II-18 | 1/1 | 1.00 | invention |
| II-1/II-18 | 1/1 | 0.92 | comparison |
| II-19/II-18 | 1/1 | 0.94 | comparison |
| I-33/II-18 | 2/1 | 0.97 | invention |
| II-19/II-18 | 2/1 | 0.91 | comparison |

TABLE 3

*The Sensitivity was normalised to that of combination I-33/II-18/II-9.
The dye listed first was also added first to the emulsion.

| Spectral sensitiser mixture | Mixture ratio | Sensitivity* | Type of sample |
|---|---|---|---|
| I-31/II-18/II-9 | 10/3/1 | 0.99 | invention |
| I-33/II-18/II-9 | 10/3/1 | 1.00 | invention |
| II-1/II-18/II-9 | 10/3/1 | 0.91 | comparison |
| II-19/II-18/II-9 | 10/3/1 | 0.93 | comparison |
| I-33/II-18/II-9 | 12/4/1 | 0.97 | invention |
| II-19/II-18/II-9 | 12/4/1 | 0.90 | comparison |

Example 2

The preparation of the basic photographic emulsion and the ripening and spectral sensitisation thereof were effected analogously to Example 1, except that a mixture of cyan couplers BG-1 and BG-2 was used instead of magenta coupler M-1.

The cast indevidual layers contained the following substances per m2:

| | |
|---|---|
| AgBr corresponding to | 0.63 g AgNO$_3$ |
| | 1.38 g gelatine |
| | 0.25 g cyan coupler BG-1 |
| | 0.37 g cyan coupler BG-2 |
| | 0.62 g tricresyl phosphate |

The material was hardend by depositing a protective layer comprising 0.2 g gelatine and 0.3 g of instant hardener (H-1) per m2.

The sensitivity of the materials prepared in this manner was determined. For this purpose, samples of the materials were exposed behind a graduated wedge and were subjected to colour negative processing according to "The Journal of Photographic Science 1974, pages 597, 598".

The results are listed in Tables 4 to 6.

TABLE 4
BG-1
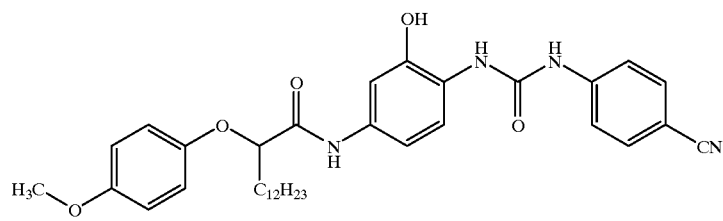
BG-2
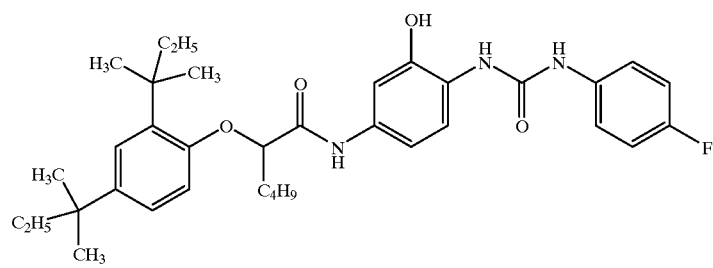
H-1
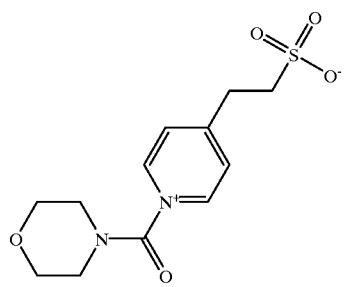
| Spectral sensitisers | Sensitivity* | Type of sample |
|---|---|---|
| I-23 | 0.98 | invention |
| I-34 | 1.00 | invention |
| V-3 | 0.95 | comparison |
| V-4 | 0.96 | comparison |
| (II)-9 | 0.92 | comparison |
*Sensitivity normalised to that of I-34.
V-3
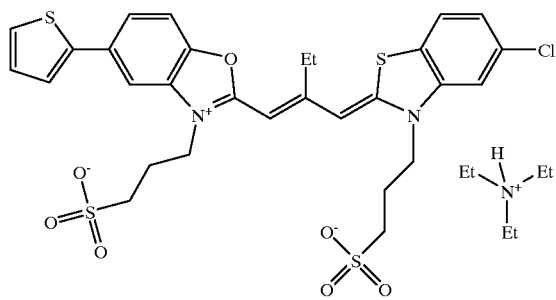

TABLE 4-continued

V-4

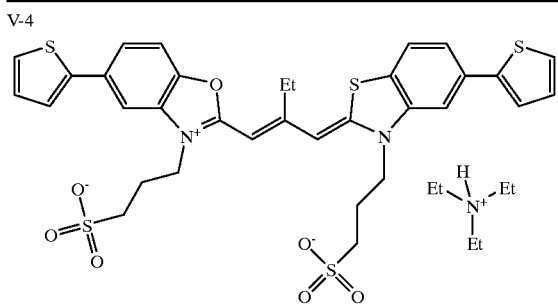

TABLE 5

*The sensitivity was normalised to that of combination I-34/(II)-13.

| Spectral sensitiser mixture | Mixture ratio | Sensitivity* | Type of sample |
|---|---|---|---|
| I-34/(II)-13 | 1/1 | 1.00 | invention |
| I-23/(II)-13 | 1/1 | 0.97 | invention |
| V-3/(II)-13 | 1/1 | 0.95 | comparison |
| V-4/(II)-13 | 1/1 | 0.95 | comparison |
| (II)-9/(II)-13 | 1/1 | 0.93 | comparison |

TABLE 6

*The sensitivity was normalised to that of combination I-34/(II)-13/(II)-14.

| Spectral sensitiser mixture | Mixture ratio | Sensitivity* | Type of sample |
|---|---|---|---|
| I-34/(II)-13/(II)-14 | 2/6/1 | 1.00 | invention |
| I-23/(II)-13/(II)-14 | 2/6/1 | 0.99 | invention |
| V-3/(II)-13/(II)-14 | 2/6/1 | 0.92 | comparison |
| V-4/(II)-13/(II)-14 | 2/6/1 | 0.91 | comparison |
| (II)-9/(II)-13/(II)-14 | 2/6/1 | 0.88 | comparison |
| I-34/(II)-13/(II)-14 | 2/5/0.2 | 0.96 | invention |
| I-23/(II)-13/(II)-14 | 2/5/0.2 | 0.96 | invention |
| V-3/(II)-13/(II)-14 | 2/5/0.2 | 0.90 | comparison |
| V-4/(II)-13/(II)-14 | 2/5/0.2 | 0.88 | comparison |
| (II)-9/(II)-13/(II)-14 | 2/5/0.2 | 0.84 | comparison |

Example 3

The preparation of the basic photographic emulsion and the ripening and spectral sensitisation thereof were effected analogously to Example 1, except that yellow coupler G-1 was used instead of magenta coupler M-1.

The cast individual layers contained the following substances per m2:

| AgBr corresponding to | 0.63 g AgNO₃ |
|---|---|
| | 0.78 g gelatine |
| | 0.78 g G-1 |
| | 0.39 g tricresyl phosphate |

The material was hardend by depositing a protective layer comprising 0.2 g gelatine and 0.3 g of instant hardener (H-1) per m2.

The sensitivity of the materials prepared in this manner was determined. For this purpose, samples of the materials were exposed behind a graduated wedge and were subjected to colour negative processing according to "The Journal of Photographic Science 1974, pages 597, 598". The results are listed in Table 7.

TABLE 7

G-1

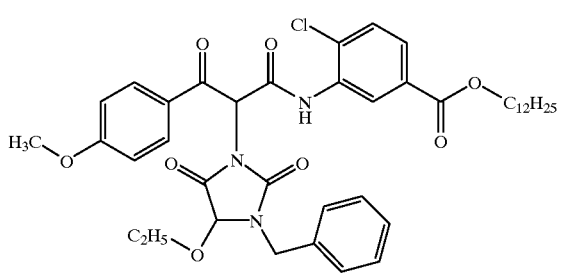

| Spectral sensitisers | Sensitivity* | Type of sample |
|---|---|---|
| I-1 | 0.96 | invention |
| I-2 | 1.00 | invention |
| I-10 | 0.99 | invention |
| V-1 | 0.87 | comparison |
| V-2 | 0.91 | comparison |
| V-3 | 0.89 | comparison |
| V-4 | 0.85 | comparison |

*Sensitivity normalised to that of I-2.

V-1

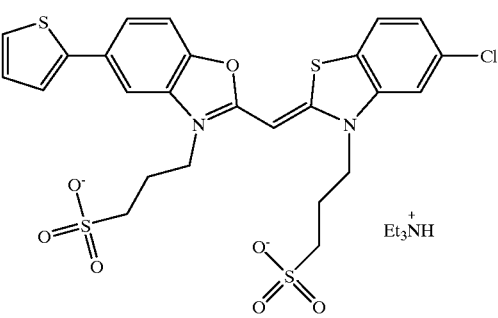

TABLE 7-continued

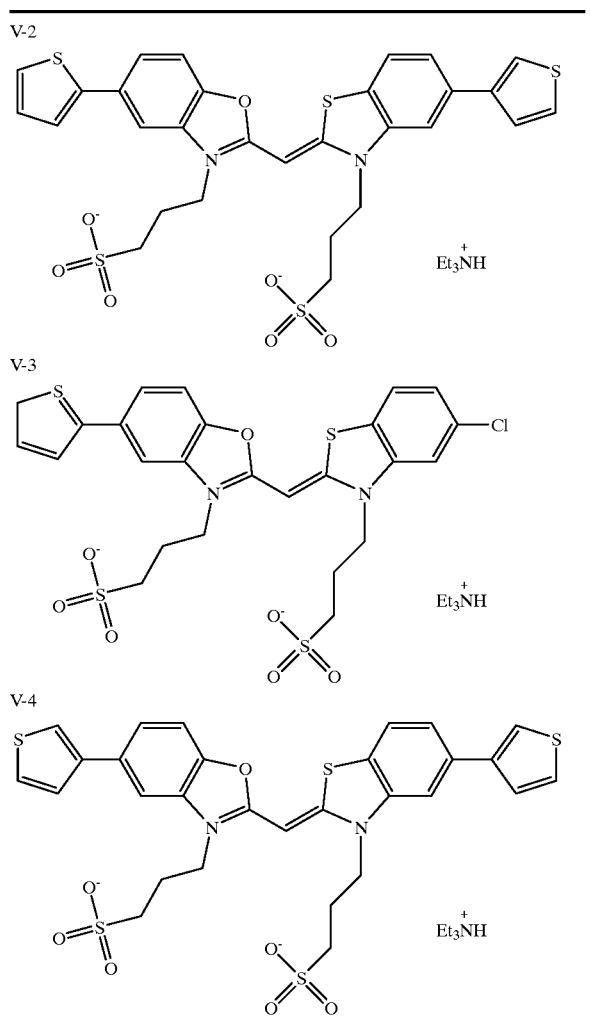

V-2

V-3

V-4

Example 4

Preparation of Emulsions:

The following solutions were each made up with demineralised water:

| solution 1: | 1000 g water |
| | 140 g gelatine |
| solution 2: | 1650 g water |
| | 360 g NaCl |
| | 0.11 mg Na3RhCl6 |
| solution 3: | 1600 g water |
| | 1000 g AgNO₃ |

Solutions 2 and 3 were added simultaneously to solution 1 at 60° C. over the course of 105 minutes, at a pAg of 7.7 and with intensive stirring. A silver chloride emulsion was formed which had an average particle diameter of 0.40 μm. The gelatine/AgNO3 ratio by weight was 0.14. The emulsion was subjected to ultrafiltration, washed, and re-dispersed with an amount of gelatine such that the gelatine/AgNO3 ratio by weight was 0.56.

Ripening and Sensitisation

The emulsion was ripened at a pH of 5.3 with the optimum amount of gold(III) chloride and Na2S2O3 at a temperature of 60° C. for 3 hours. After chemical ripening, the emulsion was spectrally sensitised at 50° C. with 2.58 mmol spectral sensitiser/kg Ag and was stabilised with 1.0 g of compound (ST)/kg Ag. 0.3 mol KBr/mol AgNO3 was subsequently added.

The cast individual layers contained the following substances per m2:

| AgCl corresponding to | 0.30 g AgNO3 |
| | 0.66 g gelatine |
| | 0.20 g PP-1 |
| | 0.10 g SC-1 |
| | 0.25 g coupler solvent K-1 |
| | 0.05 g dye stabiliser ST-2 |

The material was hardned by depositing a protective layer comprising 0.92 ggelatine and 0.34 g of instant hardener (H-1) per m2.

The sample which was thus prepared was exposed for 40 ms behind a graduated wedge and was processed as follows, using Process AP 94:

| Colour developer-45 sec-35° C. | |
| --- | --- |
| triethanolamine | 9.0 g |
| N,N-diethylenhydroxylamine | 4.0 g |
| diethylene glycol | 0.05 g |
| 3-methyl-4-amino-N-ethyl-N-methane-sulphonamidoethyl-aniline sulphate | 5.0 g |
| potassium sulphite | 0.2 g |
| triethylene glycol | 0.05 g |
| potassium carbonate | 22 g |
| potassium hydroxide | 0.4 g |
| ethylenediaminetetraacetic acid, di-Na salt | 2.2 g |
| potassium chloride | 2.5 g |
| 1,2-dihydroxybenzene-3,4,6-trisulphonic acid, Na salt | 0.3 g |
| made up with water to 1000 ml (pH = 10.0) | |
| Bleach-hardener-45 sec-35° C. | |
| ammonium thiosulphate | 75 g |
| sodium hydrogen sulphite | 13.5 g |
| ammonium acetate | 2.0 g |
| ethylenediaminetetraacetic acid (iron ammonium salt) | 57 g |
| 25% ammonia | 9.5 g |
| made up with vinegar to 1000 ml (pH = 5.5) | |

Washing: 2 min-33° C.

Drying

The green sensitivities which were determined for the materials thus prepared are listed in Table 8.

TABLE 8

| Spectral sensitiser | Sensitivity* | Type of sample |
| --- | --- | --- |
| I-31 | 1.00 | invention |
| I-33 | 0.98 | invention |
| V-5 | 0.88 | comparison |
| V-6 | 0.86 | comparison |
| V-7 | 0.80 | comparison |
| II-19 | 0.82 | comparison |
| II-20 | 0.81 | comparison |

*Sensitivity normalised to that of I-31.
V-5

TABLE 8-continued

| Spectral sensitiser | Sensitivity* | Type of sample |
|---|---|---|

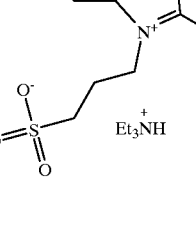

V-6

V-7

PP-1

SC-1

TABLE 8-continued

| Spectral sensitiser | Sensitivity* | Type of sample |
|---|---|---|

K-1

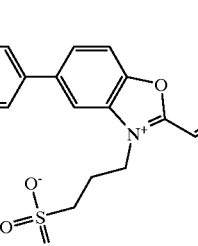

ST-2

ST

Example 5
Preparation of Emulsions

| solution 1 | 1100 g water |
| | 140 g gelatine |
| solution 2 | 1860 g water |
| | 360 g NaCl |
| solution 3 | 1800 g water |
| | 1000 g AgNO3 |

Solutions 2 and 3 were added simultaneously to solution 1 at 50° C. over the course of 300 minutes, at a pAg of 7.7 and with intensive stirring. A silver chloride emulsion was formed which had an average particle diameter of 0.85 μm. The gelatine/AgNO3 ratio by weight was 0.14. The emulsion was subjected to ultrafiltration, washed, and re-dispersed with an amount of gelatine such that the gelatine/AgNO3 ratio by weight was 0.56.

Ripening and Sensitisation

The emulsion was ripened at a pH of 5.3 with the optimum amount of gold(III) chloride and Na2S2O3 at a temperature of 50° C. for 3 hours. After chemical ripening, the emulsion was spectrally sensitised at 50° C. with 2.54 mmol spectral sensitiser/kg Ag, was stabilised with 0.5 g of compound ST-3/kg Ag, and was subsequently treated with 0.6 mol KBr/mol AgNO3 (with respect to silver nitrate).

The cast individual layers contained the following substances per m2:

| AgCl corresponding to | 0.40 g AgNO3 |
| | 0.96 g gelatine |
| | 0.55 g yellow couplerY-1 |
| | 0.21 g tricresyl phosphate |
| | 0.11 g dye stabiliser STA |

The material was hardened by depositing a protective layer comprising 0.92 g gelatine and 0.34 g of instant hardener (H-1) per m2.

Exposure and development were effected as in Example 4.

The blue sensitivities which were determined for the materials thus prepared are listed in Table 9.

TABLE 9

| Spectral sensitiser | Sensitivity* | Type of sample |
|---|---|---|
| I-1 | 0.95 | invention |
| I-2 | 1.00 | invention |
| I-10 | 0.97 | invention |
| V-1 | 0.87 | comparison |
| V-2 | 0.91 | comparison |
| V-3 | 0.85 | comparison |
| V-4 | 0.84 | comparison |

*The sensitivity was normalised to that of I-2.

ST-3

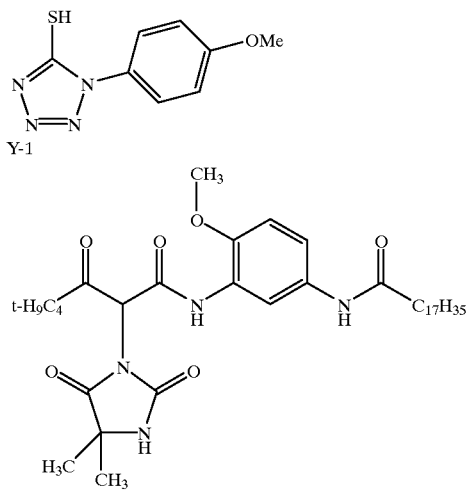

Y-1

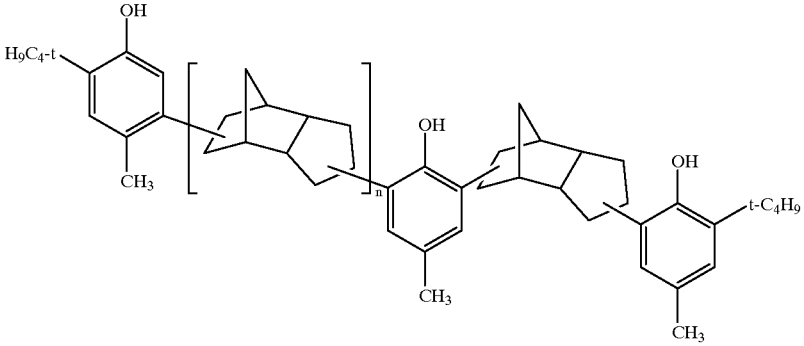

STA

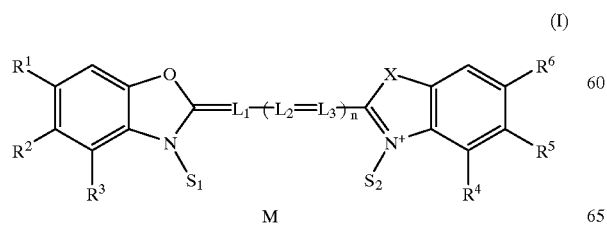

What is claimed is:

1. A color photographic silver halide material which comprises at least one light-sensitive silver halide emulsion, and a cyanine dye of formula (I)

(I)

$$\begin{array}{c} R^1 \\ R^2 \\ R^3 \end{array} \begin{array}{c} O \\ N \\ S_1 \end{array} = L_1 (L_2 = L_3)_n \begin{array}{c} X \\ N^+ \\ S_2 \end{array} \begin{array}{c} R^6 \\ R^5 \\ R^4 \end{array}$$

M wherein $R^1$, $R^2$, $R^3$, $R^4$ $R^5$ and $R^6$ independently of each other, each represent a substitutent, with the proviso that at least one of the radicals $R^1$, $R^2$ and $R^3$ represents a benzthienyl substitutent, X represents O, S, Se, $NR_7$, CH=CH or $C(CH_3)_2$, wherein $R_7$ represents an alkyl radical which is optionally substituted, $S_1$ and $S_2$ independently of each other, represent alkyl, sulphoalkyl, carboxyalkyl, —$(CH_2)_l$—$SO_2$—Y—$SO_2$-alkyl, —$(CH_2)_l$—$SO_2$—Y—CO-alkyl, —$(CH_2)_l$—CO—Y—$SO_2$-alkyl, —$(CH_2)_l$—CO—Y—O-alkyl, —$(CH_2)_l$—NH—$SO_3^\ominus$, —$(CH_2)_l$—N(alkyl)—$SO_3^\ominus$ or —$(CH_2)_l$—N(Aryl)—$SO_3^\ominus$, with the proviso that l=1 to 6 and Y is NH or N—, n is 0, 1, 2 or 3, $L_1$, $L_2$ and $L_3$ independently represent a substituted or unsubstituted methine group, which may be a constituent of one or more carbocyclic rings, and M represents a counterion which may be necessary for charge compensation.

2. A color photographic silver halide material according to claim 1, wherein formula (I) is at least one cyanine dye of formula (Ia)

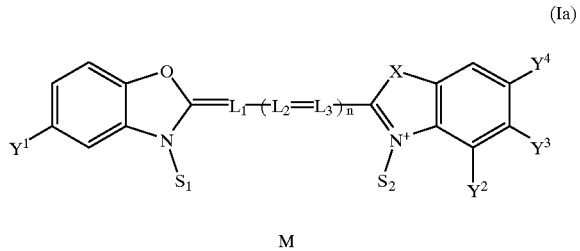

(Ia)

wherein $Y^1$ represents a benzthienyl group which is bonded to the nucleus via the 2-, 3-, 4-, 5-, 6- or 7- positions, $Y^2$, $Y^3$, and $Y^4$ independently of each other represent H, halogen, a substituted or unsubstituted 2-, 2- or 3-pyrrolyl, 3- or 3-thienyl, 2-, 3-, 4-, 5-, 6-, or 7-benzthienyl, N-indolyl, phenyl or 2- or 3-furanyl residue or alkyl, X represents O, S, Se, $NR_7$, CH=CH or C $(CH_3)_2$, wherein $R_7$ represents an alkyl radical which is optionally substituted, $S_1$ and $S_2$ independently of each other, represent alkyl, sulphoalkyl, carboxyalkyl, $-(CH_2)_l-SO_2-Y-SO_2$-alkyl, $-(CH_2)_l-SO_2-Y-CO$-alkyl, $-(CH_2)_l-CO-Y-SO_2$-alkyl, $-(CH_2)_l-CO-Y-O$-alkyl, $-(CH_2)_l-NH-SO_3^\ominus$, $-(CH_2)_l-N$(alkyl)$-SO_3^\ominus$ or $-(CH_2)_l-N$(Aryl)$-SO_3^\ominus$, with the proviso that l=1 to 6 and Y is NH or N—, n is 0, 1, 2 or 3, $L_1$, $L_2$ and $L_3$ independently represent a substituted or unsubstituted methine group, which may be a constituent of one or more carbocyclic rings, and M Represents a counterion which may be necessary for change compensation.

3. The color photographic silver halide material according to claim 1, which additionally contains at least one cyanine dye of formula (II)

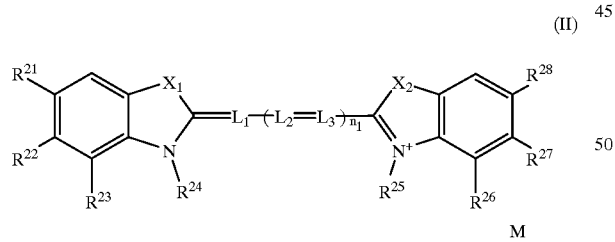

(II)

wherein $X_1$ and $X_2$ Independently of each other, represent O, S, Se, $NR_9$, $C(CH_3)_2$ or CH=CH, wherein $R_9$ represents an alkyl radical which is optionally substituted, $R^{24}$ and $R^{25}$ independently of each other, represent alkyl, sulphoalkyl, carboxyalkyl, $(CH_2)_l-SO_2-Y-SO_2$-alkyl, $-(CH_2)_l-SO_2-Y-CO$-alkyl, $-(CH_2)_l-CO-Y-SO_2$-alkyl or $-(CH_2)_l-CO-Y-CO$-alkyl, with the proviso that l=1 to 6 and Y is NH or N—, $R^{21}$, $R^{22}$, $R^{23}$, $R^{26}$, $R^{27}$ and $R^{28}$ independently of each other, represent a halogen, H, alkyl, alkoxy, 2-thienyl, 3-thienyl, 1-pyrrolyl, 2-furanyl, 3-furanyl, CN, $CF_3$ or aryl; or $R^{21}$ together with $R^{22}$, or $R^{22}$ together with $R^{23}$, or $R^{26}$ together with $R^{27}$, or $R^{27}$ together with $R^{28}$ denote the remaining members for the completion of a benzo or naptho ring system which is optionally substituted, $n_1$=0 or 1, $L_1$, $L_2$ and $L_3$ independently of each other, represent substituted or unsubstituted methine groups, and M Represents a counterion which may be necessary for charge compensation.

4. The color photographic silver halide material according to claim 2, which additionally contains at least one cyanine dye of formula (II)

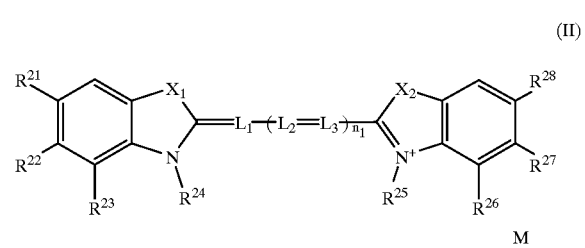

(II)

wherein $X_1$ and $X_2$ Independently of each other, represent O, S, Se, $NR_9$, $C(CH_3)_2$ or CH=CH, wherein $R_9$ represents an alkyl radical which is optionally substituted, $R^{24}$ and $R^{25}$ independently of each other, represent alkyl, sulphoalkyl, carboxyalkyl, $(CH_2)_l-SO_2-Y-SO_2$-alkyl, $-(CH_2)_l-SO_2-Y-CO$-alkyl, $-(CH_2)_l-CO-Y-SO_2$-alkyl or $-(CH_2)_l-CO-Y-CO$-alkyl, with the proviso that l=1 to 6 and Y is NH or N—, $R^{21}$, $R^{22}$, $R^{23}$, $R^{26}$, $R^{27}$ and $R^{28}$ independently of each other, represent a halogen, H, alkyl, alkoxy, 2-thienyl, 3-thienyl, 1-pyrrolyl, 2-furanyl, 3-furanyl, CN, $CF_3$ or aryl; or $R^{21}$ together with $R^{22}$, or $R^{22}$ together with $R^{23}$, or $R^{26}$ together with $R^{27}$, or $R^{27}$ together with $R^{28}$ denote the remaining members for the completion of a a benzo or naphtho ring system which is optionally substituted, $n_1$=0 or 1, $L_1$, $L_2$ and $L_3$ independently of each other, represent substituted or unsubstituted methine groups, and M Represents a counterion which may be necessary for charge compensation.

5. The color photographic silver halide material according to claim 3, wherein cyanine dyes according to formula (I) and (II) are present in a mixture ratio from 0.1:10 to 10:0.1.

6. The color photographic silver halide material according to claim 4, wherein cyanine dyes according to formula (Ia) and (II) are present in a mixture ratio from 0.1:10 to 10:0.1.

7. The color photographic silver halide material according to claim 3, wherein one cyanine dye corresponding to formula (I) is used with two cyanine dyes corresponding to formula (II).

8. The color photographic silver halide material according to claim 4, wherein one cyanine dye corresponding to formula (II) is used with two cyanine dyes corresponding to formula (I).

9. The color photographic silver halide material according to claim 5, wherein one cyanine dye corresponding to formula (Ia) is used with two cyanine dyes corresponding to formula (II).

10. The color photographic silver halide material according to claim 5, wherein one cyanine dye corresponding to formula (II) is used with two cyanine dyes corresponding to formula (Ia).

11. The color photographic silver halide material according to claim 1, wherein the silver halide material further contains tabular grain emulsions.

12. The color photographic silver halide material according to claim 2, wherein the silver halide material further contains tabular grain emulsions.

13. The color photographic silver halide material according to claim 3, wherein the silver halide material further contains tabular grain emulsions.

14. The color photographic silver halide material according to claim 4, wherein the silver halide material further contains tabular grain emulsions.

15. The color photographic silver halide material according to claim 3, wherein cyanine dyes according to formulae (I) and (II) are present in a mixture ratio from 3:1 to 20:1.

16. The color photographic silver halide material according to claim 4, wherein cyanine dyes according to formula (Ia) and (II) are present in a mixture ratio from 3:1 to 20:1.

* * * * *

UNITED STATES PATENT AND TRADEMARK OFFICE
CERTIFICATE OF CORRECTION

PATENT NO. : 6,280,921 B1
DATED : August 28, 2001
INVENTOR(S) : Michael Missfeldt et al.

It is certified that error appears in the above-identified patent and that said Letters Patent is hereby corrected as shown below:

Title page,
The first named inventor is "Michael Missfeldt" and the patent should be referred to as -- Missfeldt et al. --
The Assignee shown as "AGFA-Gevaert (BE)" should read as -- AGFA-GEVAERT (BE) --

Column 36,
Line 58, "$SO_2$-alkyl.- $(CH_2)_1$-$SO_2$-Y-CO-alkyl," should read as -- $SO_2$-alkyl,-$(CH_2)_1$-$SO_2$-Y-CO-alkyl, --

Column 38,
Lines 42-43, "...of a a benzo or naphtho..." should read as -- of a benzo or naphtho... --

Signed and Sealed this

Twenty-first Day of May, 2002

Attest:

Attesting Officer

JAMES E. ROGAN
*Director of the United States Patent and Trademark Office*